Figure 1:
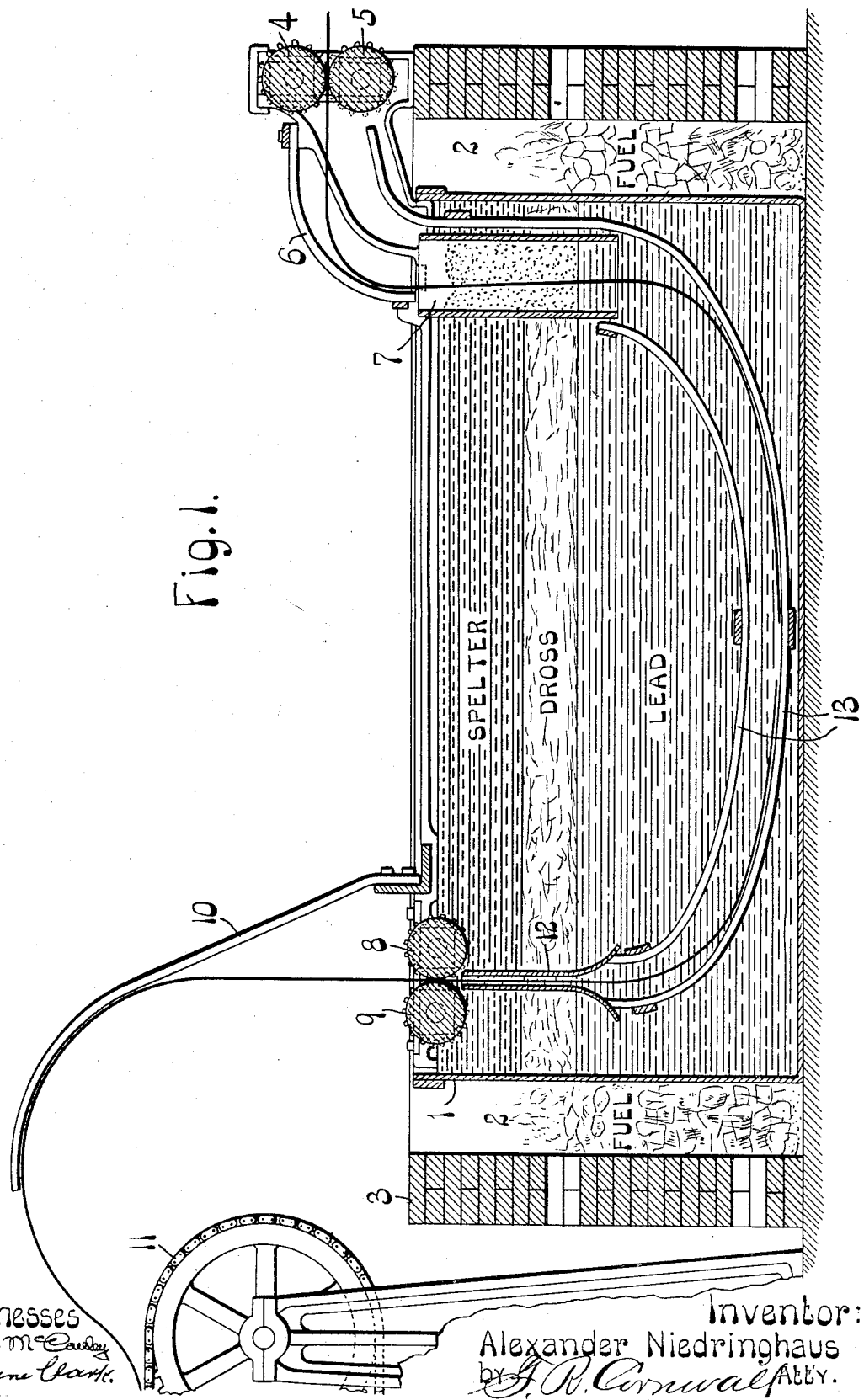

A. NIEDRINGHAUS.
GALVANIZING APPARATUS.
APPLICATION FILED MAR. 11, 1909.

943,315.

Patented Dec. 14, 1909.

3 SHEETS—SHEET 1.

Witnesses

Inventor:
Alexander Niedringhaus

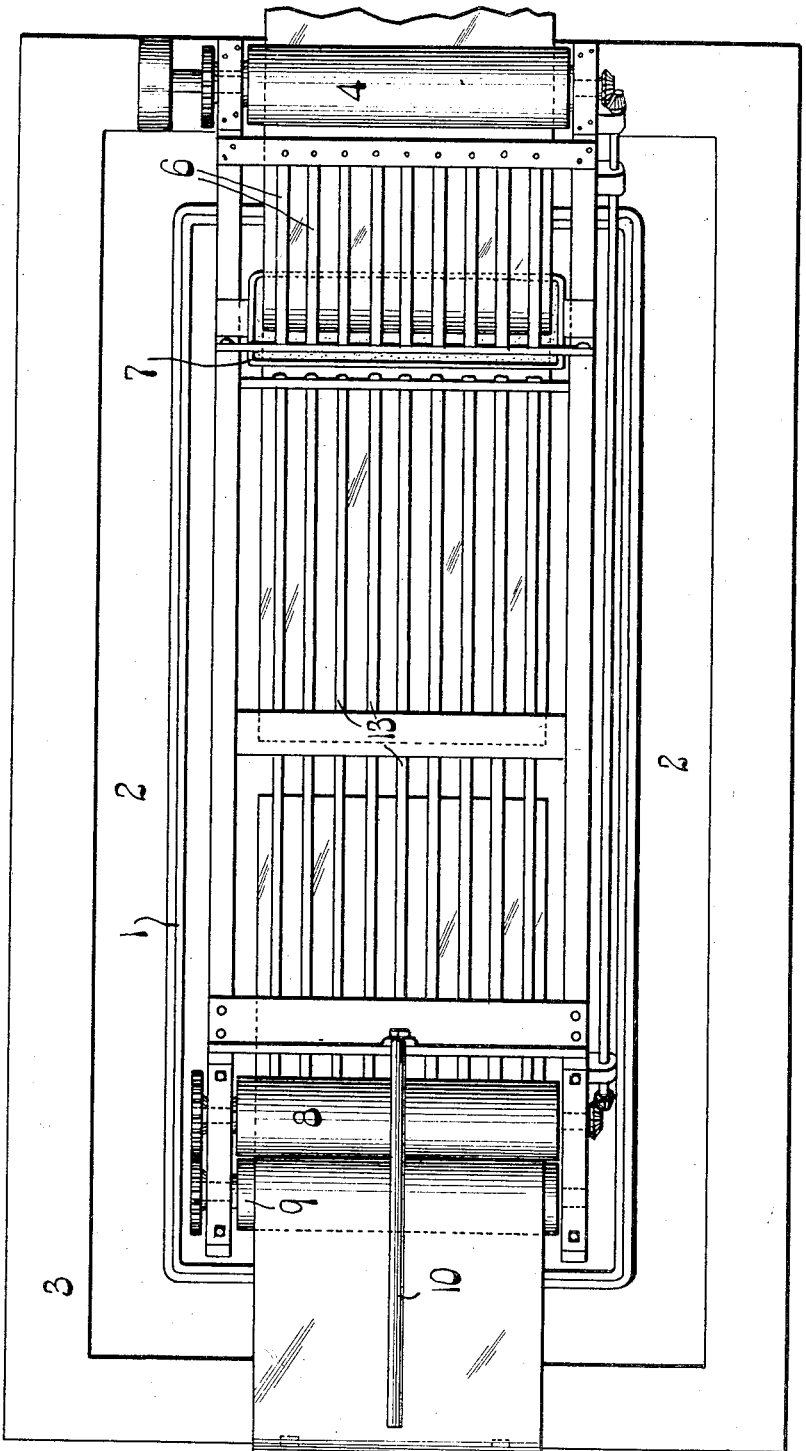

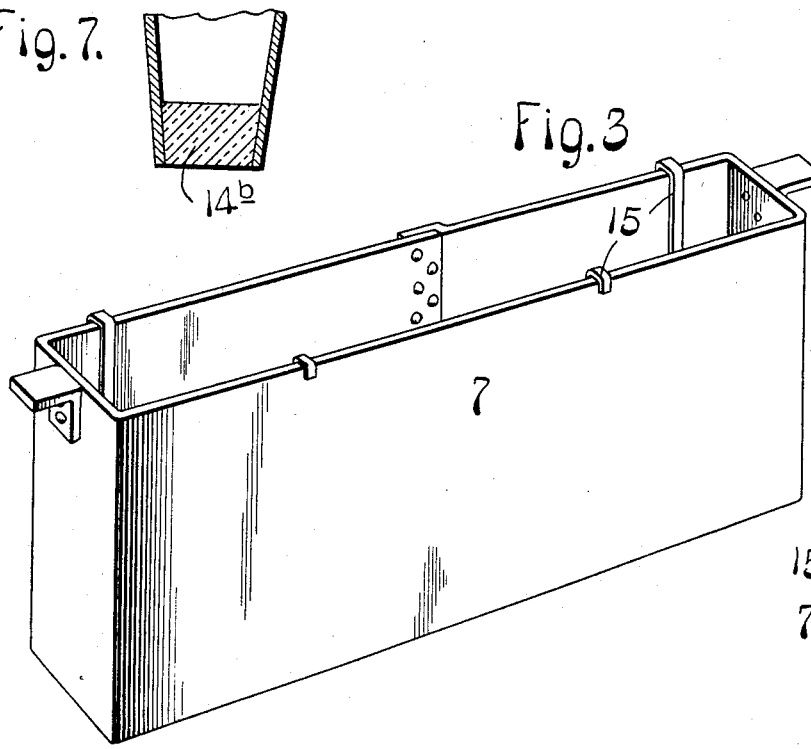
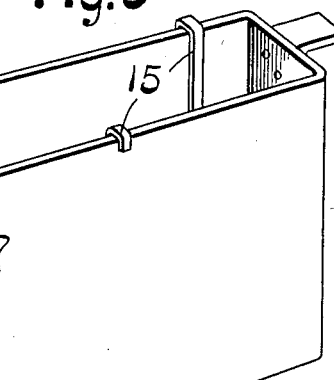
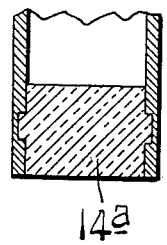
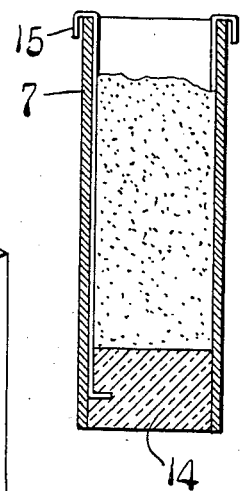
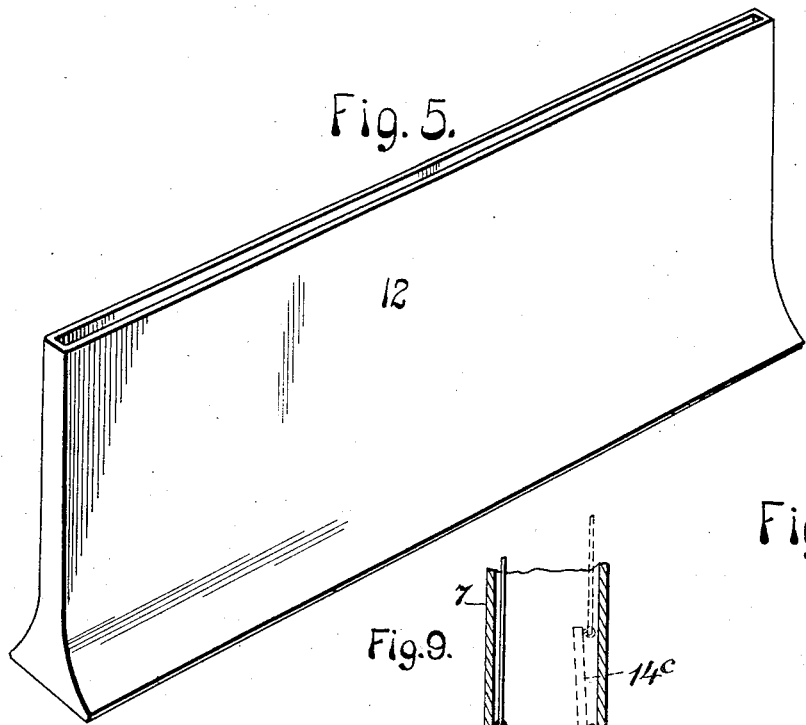
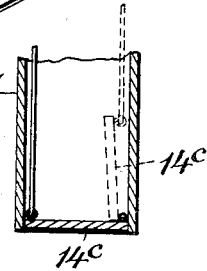
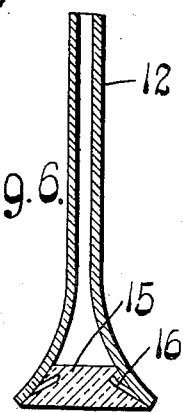

UNITED STATES PATENT OFFICE.

ALEXANDER NIEDRINGHAUS, OF ST. LOUIS, MISSOURI.

GALVANIZING APPARATUS.

943,315.

Specification of Letters Patent.   Patented Dec. 14, 1909.

Application filed March 11, 1909.  Serial No. 482,769.

*To all whom it may concern:*

Be it known that I, ALEXANDER NIEDRINGHAUS, a citizen of the United States, residing at St. Louis, Missouri, have invented a certain new and useful Improvement in Galvanizing Apparatus, of which the following is a full, clear, and exact description, such as will enable others skilled in the art to which it appertains to make and use the same, reference being had to the accompanying drawings, forming part of this specification, in which—

Figure 1 is a longitudinal sectional view through my improved galvanizing apparatus. Fig. 2 is a top plan view of the same. Fig. 3 is a detailed view of a flux box. Fig. 4 is a vertical cross-sectional view through said flux box. Fig. 5 is a detail view of the galvanizing box. Fig. 6 is a vertical cross-sectional view through said galvanizing box. Figs. 7 and 8 are sectional views of modified forms of boxes. Fig. 9 is another modified form of box.

This invention relates to a new and useful improvement in galvanizing apparatus.

In the galvanizing of plates where molten lead is used in the bath, a flux box is also used, through which flux box the sheet to be galvanized is passed prior to its introduction into the molten lead bath. Great difficulty has been experienced in the use of these flux boxes because the metal of which they are composed burns out at the lower portion, or is eaten away so that spelter and dross enter and the flux escapes into the kettle. The boxes, therefore, have to be frequently renewed. In introducing a new box into position, the lower open end of the box will trap a quantity of spelter and dross, which in practice has had to be ladled out after the box was submerged in position. It has been found to be impossible, however, to ladle out all of the spelter and dross. The object of the flux box in excluding the spelter and dross is to enable the sheet, after passing through the flux box, to be first treated in the lead bath where it is heated to the proper temperature and thus made in readiness to receive the coating of zinc which more readily adheres to the heated plate, and the plate being of an even temperature throughout, will partake of an even coating of zinc.

My invention consists in the provision of means in the flux box to exclude spelter and dross in submerging or partially submerging the flux box into position. This means, in the form of a plug or stopper in the lower end of the flux box, may be metallic lead, which will melt after its introduction and become part of the molten lead bath; or said plug may be wood and be burned away, in this manner being destructible; or said plug may be of plaster of paris or some other material which is capable of being broken into small particles. The galvanizing box at the discharge end of the kettle is likewise provided with a fusible, destructible or breakable plug, so that when it is submerged the dross will be excluded.

1 indicates the walls of the kettle or tank, around which is a space 2 for the fuel, said fuel burning between the walls 1 and brick walls 3.

4 and 5 are the feed rolls between which the sheets pass in entering the kettle, said sheets striking deflecting finger 6 and being guided down into and through the flux box 7. This flux box, as shown in Figs. 3 and 4, is made of sheet metal and suspended from the walls of the tank. The box is open at its top and bottom, the upper end projecting above the surface of the molten spelter and the lower end of the box projecting below the surface of the molten lead bath. In this box is arranged the fluxing material through which the sheet to be galvanized passes on its way to the molten lead bath, which molten lead bath heats the sheet preparatory to its contact with the molten zinc, which latter material adheres to the surface of the sheet, forming a skin or coat thereon, the sheet passing through squeezing rollers 8 and 9 as it issues from the kettle. Beyond the kettle the sheet is bent over by guide fingers 10 on to the conveyer chain 11, on which chain it is permitted to cool.

It is quite important at the finishing stage to have the dross excluded from the galvanizing box, and the galvanizing box therefore bridges the dross, its lower end being submerged in the molten lead bath and its upper end terminating under the rollers 8 and 9 below the upper surface of the spelter bath. The spelter bath can thus overflow into the galvanizing box and keep it filled at all times. The dross is an objectionable element in galvanizing. These substances may be impurities in the spelter which drop to the bottom, or impurities in the lead which flow to the top.

As the spelter is used, it is replenished by adding spelter, which melts and overflows into the galvanizing box. The lead, of course, may be replenished in the same way by adding metallic lead when needed. The dross may accumulate and fill up between the lead and spelter to the top of the galvanizing box 12, the box 12 excluding the dross from the sheets. Should the dross get on the sheet it will leave lumps, which are objectionable. As the dross builds up, it is preferable to remove it by ladling it out, or it can be piled in the center until convenient to remove it so as to float upon the surface of the lead between the flux and galvanizing boxes. I have used the term "galvanizing box" in referring to the box 12, for the reason that it is within this box that the sheet to be galvanized receives its coating of zinc or spelter.

13 represent guiding bars which guide the plate to be galvanized through the molten lead bath. In some kettles rollers are used.

Referring to Fig. 4, 14 is a plug in the lower end of the flux box 7. This plug is preferably metallic lead, which is held in position by suspending rods 15; or the walls of the box 7 may be grooved, as shown in Fig. 8 and the plug 14$^a$ cast therein; or the lower walls of the box 7 may be bent inwardly and the plug 14$^b$ supported in position by these inwardly bent walls; the plug may be of wood, plaster of paris, or in fact any material which will exclude spelter and dross upon the introduction of the flux box into position. In preparing the flux box to be introduced into position in the kettle, the plug is arranged in place, and the box placed in the kettle. If the plug is of metallic lead it will, upon coming in contact with the molten lead, melt and permit the passage of its sheet to the box. If the plug is of wood it may be burned away, the ashes not being objectionable. If the plug is of plaster of paris it may be broken, and particles will float on the surface of the lead. The so-called galvanizing box 12 is provided with a plug 15 in its bottom for the same purpose, and this plug may be made of any suitable material, and be held in place in an appropriate way. I have shown inwardly extending lugs 16 in the drawing, around which the metal constituting plug 15 is cast.

Instead of using a plug at the bottom of the box, I may arrange a removable stopper, or a hinged door or valve which can be taken away, or opened, as the case may be, after the box is submerged in the molten metal. This is illustrated in Fig. 9 wherein 14$^c$ indicates a hinged door or panel having a wire connected to its free edge, whereby when the box is inserted in position the door may be opened and held open. My invention is, therefore, not limited to a vanishing plug such, for instance, as metal which will melt, or wood which will burn away, or a destructible plug such as plaster of paris, which can be broken. It is obvious that it is possible in the introduction of the guide fingers 13, to house in said fingers, and the parts to which they are connected, with lead or other material to exclude the dross during the time that the guide bars are being introduced into position, which dross might accumulate thereon and come in contact with the sheets passing under the guide bar.

While I have illustrated in the drawings, and described in these specifications, the use of molten lead in the bath, it is obvious that the molten lead can be left out and that my improvements can be used in connection with spelter baths where no lead is present, to exclude the floating impurities.

I am aware that changes in the construction and arrangement of the several parts of my device can be made and substituted without in the least departing from the nature and principle of my invention.

Having thus described my invention, what I claim is:

1. In a galvanizing apparatus, a flux box having a plug in its bottom, which plug will exclude substances floating on top of the lead bath during the time that the flux box is being introduced into position.

2. In a galvanizing apparatus, a flux box having a fusible plug in its bottom.

3. In a galvanizing apparatus, a flux box having a destructible plug in its bottom.

4. In a galvanizing apparatus, a galvanizing box having a plug in its bottom, which plug will exclude particles floating on the surface of the molten lead during its introduction into position.

5. In a galvanizing apparatus, a galvanizing box having a fusible plug in its bottom.

6. In a galvanizing apparatus, a galvanizing box having a destructible plug in its bottom.

7. In a galvanizing apparatus, an open-ended box having a metallic lead plug in its lower end, which will fuse with the molten lead bath after its introduction into position.

8. In a galvanizing apparatus, an open-ended box provided with a movable closure for its lower end which will exclude superposed strata during the introduction of the box into position in the molten bath.

9. In a galvanizing apparatus, an open-ended box provided with a vanishing closure for its lower end which will exclude superposed strata during the introduction of the box into position in the molten bath.

10. In a galvanizing apparatus, an open-ended box provided with a removable closure for its lower end which will exclude superposed strata during the introduction of the box into position in the molten bath.

In testimony whereof I hereunto affix my signature in the presence of two witnesses, this 8th day of March. 1909.

ALEXANDER NIEDRINGHAUS.

Witnesses:
F. R. CORNWALL,
LENORE CLARK.